US010142865B2

(12) United States Patent
Devarasetty

(10) Patent No.: US 10,142,865 B2
(45) Date of Patent: Nov. 27, 2018

(54) METHODS, SYSTEMS AND COMPUTER READABLE MEDIA FOR SIMULATING PER USER EQUIPMENT (UE) SLOW AND FAST SIGNAL FADING FOR TESTING AIR INTERFACE DEVICES

(71) Applicant: Ixia, Calabasas, CA (US)

(72) Inventor: Prasada Rao Devarasetty, Cary, NC (US)

(73) Assignee: KRYSIGHT TECHNOLOGIES SINGAPORE (HOLDINGS) PTE. LTD., Singapore (SG)

(*) Notice: Subject to any disclaimer, the term of this patent is extended or adjusted under 35 U.S.C. 154(b) by 179 days.

(21) Appl. No.: 15/134,338

(22) Filed: Apr. 20, 2016

(65) Prior Publication Data
US 2017/0311186 A1  Oct. 26, 2017

(51) Int. Cl.
H04W 24/06 (2009.01)
H04L 5/00 (2006.01)
H04B 17/391 (2015.01)

(52) U.S. Cl.
CPC ........ H04W 24/06 (2013.01); H04B 17/3911 (2015.01); H04L 5/0007 (2013.01); H04L 5/0051 (2013.01)

(58) Field of Classification Search
CPC ... H04W 24/06; H04B 17/3911; H04L 5/0007
See application file for complete search history.

(56) References Cited

U.S. PATENT DOCUMENTS 5,465,393 A    11/1995  Frostrom et al.
8,019,385 B1 *  9/2011  Mansour .............. H04B 17/101
                                                          455/452.2
(Continued)

FOREIGN PATENT DOCUMENTS

EP        2 262 134 A2    12/2010
JP        2011-193124 A    9/2011
(Continued)

OTHER PUBLICATIONS

Communication of the extended European search report for European Application No. 14832004.7 (dated Feb. 8, 2017).
(Continued)

Primary Examiner — Siming Liu

(57) ABSTRACT

A network equipment test device includes per-UE uplink signal generation processing chains for generating per-UE time domain uplink signals. Per-UE signal faders simulate per-UE signal fading for the per-UE time domain uplink signals. Different phases and amplitudes are used over time to simulate different signal fading. Fourier transformation units perform Fourier transformation of each of the time domain uplink signals to produce per-UE frequency domain uplink signals with simulated per-UE signal fading. A subcarrier mapping unit performs subcarrier mapping of the per-UE frequency domain uplink signals to produce a frequency domain multi-UE uplink signal with simulated per-UE signal fading. An inverse Fourier transformation unit performs inverse Fourier transformation of the frequency domain multi-UE uplink signal to produce a multi-UE time domain uplink signal with simulated per-UE signal fading. A network interface transmits the time domain multi-UE uplink signal with simulated per-UE signal fading to the DUT.

18 Claims, 4 Drawing Sheets

(56) References Cited

U.S. PATENT DOCUMENTS

| | | | |
|---|---|---|---|
| 8,050,338 B2 | 11/2011 | Wilhelmsson | |
| 9,432,859 B2 | 8/2016 | Devarasetty et al. | |
| 9,444,561 B2 | 9/2016 | Devarasetty et al. | |
| 2006/0012388 A1* | 1/2006 | Lin | H04W 24/00 324/754.08 |
| 2006/0122814 A1 | 6/2006 | Beens et al. | |
| 2006/0258320 A1 | 11/2006 | Huang | |
| 2009/0163212 A1 | 6/2009 | Hall et al. | |
| 2009/0268828 A1 | 10/2009 | Roberts | |
| 2010/0075678 A1 | 3/2010 | Akman et al. | |
| 2011/0053516 A1 | 3/2011 | Harteneck | |
| 2011/0142115 A1 | 6/2011 | Wang et al. | |
| 2011/0270567 A1 | 11/2011 | Mow et al. | |
| 2011/0299570 A1 | 12/2011 | Reed | |
| 2012/0121038 A1 | 5/2012 | Liu et al. | |
| 2012/0269278 A1 | 10/2012 | Onggosanusi et al. | |
| 2013/0143503 A1 | 6/2013 | Li et al. | |
| 2013/0184023 A1 | 7/2013 | Asokan et al. | |
| 2013/0208603 A1 | 8/2013 | Choi et al. | |
| 2013/0303089 A1 | 11/2013 | Wang et al. | |
| 2015/0031310 A1 | 1/2015 | Devarasetty et al. | |
| 2015/0117225 A1 | 4/2015 | Devarasetty et al. | |

FOREIGN PATENT DOCUMENTS

| | | | |
|---|---|---|---|
| KR | 10-2000-0072934 A | 12/2000 | |
| KR | 10-2008-0066321 A | 7/2008 | |
| KR | 10-2011-0085274 A | 7/2011 | |
| KR | 10-2011-0112502 A | 10/2011 | |
| WO | WO 2015/017082 A1 | 5/2015 | |
| WO | WO 2015/065900 A1 | 5/2015 | |

OTHER PUBLICATIONS

Communication of the European publication number and information on the application of Article 67(3) EPC for European Application No. 14832004.7 (dated Aug. 10, 2016).
Supplemental Notice of Allowability for U.S. Appl. No. 14/049,193 (dated Jul. 18, 2016).
Communication of European publication number and information on the application of Article 67(3) EPC for European Application No. 14832004.7 (dated May 11, 2016).
Notice of Allowance and Fee(s) Due for U.S. Appl. No. 14/069,215 (dated Apr. 29, 2016).
Communication of the extended European search report for European Application No. 14857488.2 (dated May 16, 2017).
Notice of Allowance and Fee(s) Due & Applicant-Initiated Interview Summary for U.S. Appl. No. 14/049,193 (dated Apr. 5, 2016).
"Rayleigh fading, Wikipedia, https://en.wikipedia.org/wiki/Rayleigh_fading," pp. 1-5 (Jan. 29, 2016).
Final Office Action for U.S. Appl. No. 14/069,215 (dated Dec. 22, 2015).
Final Office Action for U.S. Appl. No. 14/049,193 (dated Dec. 10, 2015).
Non-Final Office Action for U.S. Appl. No. 14/049,193 (dated Jun. 30, 2015).
Non-Final Office Action for U.S. Appl. No. 14/069,215 (dated Apr. 29, 2015).
Notification of Transmittal of the International Search Report and the Written Opinion of the International Searching Authority, or the Declaration for International Application No. PCT/US2014/062399 (dated Jan. 20, 2015).
Notification of Transmittal of the International Search Report and the Written Opinion of the International Searching Authority, or the Declaration for PCT International Application No. PCT/US2014/045647 (dated Nov. 5, 2014).
Zhong et al., "The MITRE Tactical Channel Emulation System," The MITRE Corporation, Case 13/1750 (May 2013).
Sur et al, "Doppler Shift Impact on the MIMO OFDM System in Vehicular Channel Condition," I.J. Information Technology and Computer Science, vol. 8, pp. 57-62 (2012).

* cited by examiner

METHODS, SYSTEMS AND COMPUTER READABLE MEDIA FOR SIMULATING PER USER EQUIPMENT (UE) SLOW AND FAST SIGNAL FADING FOR TESTING AIR INTERFACE DEVICES

TECHNICAL FIELD

The subject matter described herein relates to testing communications network equipment. More particularly, the subject matter described herein relates to methods and systems for simulating per-UE slow and fast signal fading for testing air interface devices.

BACKGROUND

In mobile communications networks, fixed network equipment, such as evolved Node Bs (e-Node Bs), communicates with mobile UEs over the air interface. When a UE communicates with an e-Node B, scattering of uplink signals can result in multipath reception by the e-Node B. If the multipath signals are out of phase (which they usually are due to different signal path lengths), signal cancellation, distortion and phase shifting can occur. Such signal cancellation and phase shifting due to multipath reception is referred to as signal fading.

Signal fading can be characterized as fast fading or slow fading. Fast fading refers to multipath reception that causes a received signal to fade rapidly in time, and slow fading refers to multipath reception that causes a received signal to fade slowly in time.

It is desirable to test the functionality and performance of air interface equipment in response to fast and slow signal fading on a per-UE basis. However, signal fading simulation equipment is typically wideband equipment that simulates signal fading downstream from UEs. In addition, wideband signal fading simulators can be expensive.

In light of these difficulties, there exists a need for methods, systems, and computer readable media for simulating per-UE fast and slow signal fading for testing air interface devices.

SUMMARY

A method for testing an air interface device using signals with simulated per user equipment (UE) signal fading occurs at a network equipment test device. The method includes generating, using per-UE uplink signal generation processing chains in a multi-UE simulator of the network equipment test device, per-UE time domain uplink signals. The method further includes simulating, using the per-UE uplink signal generation processing chains, per-UE signal fading for the per-UE time domain uplink signals, where simulating per-UE signal fading includes using different phases and amplitudes over time to simulate different signal fading. The method further includes performing Fourier transformation of each of the per-UE time domain uplink signals with simulated per-UE signal fading to produce per-UE frequency domain uplink signals with simulated per-UE signal fading. The method further includes performing subcarrier mapping of the per-UE frequency domain uplink signals with simulated per-UE signal fading to produce a frequency domain multi-UE uplink signal with simulated per-UE signal fading. The method further includes performing inverse Fourier transformation of the frequency domain multi-UE uplink signal to produce a time domain multi-UE uplink signal with simulated per-UE signal fading. The method further includes transmitting the time domain multi-UE uplink signal with simulated per-UE signal fading to the air interface device under test.

A network equipment test device includes per-UE uplink signal generation processing chains for generating per-UE time domain uplink signals. The per-UE uplink signal generation processing chains include per-UE signal faders that simulate per-UE signal fading for the per-UE time domain uplink signals, where simulating per-UE signal fading includes using different phases and amplitudes over time to simulate different signal fading. Per-UE Fourier transformation units perform Fourier transformation of each of the per-UE time domain uplink signals with simulated per-UE signal fading to produce per-UE frequency domain uplink signals with simulated per-UE signal fading. A subcarrier mapping unit performs subcarrier mapping of the per-UE frequency domain uplink signals to produce a frequency domain multi-UE uplink signal with simulated per-UE signal fading. An inverse Fourier transformation unit performs inverse Fourier transformation of the frequency domain multi-UE uplink signal to produce a time domain multi-UE uplink signal with simulated per-UE signal fading. A network interface transmits the time domain multi-UE uplink signal with simulated per-UE signal fading to the air interface device under test.

The subject matter described herein for simulating per-UE signal fading for testing air interface devices may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
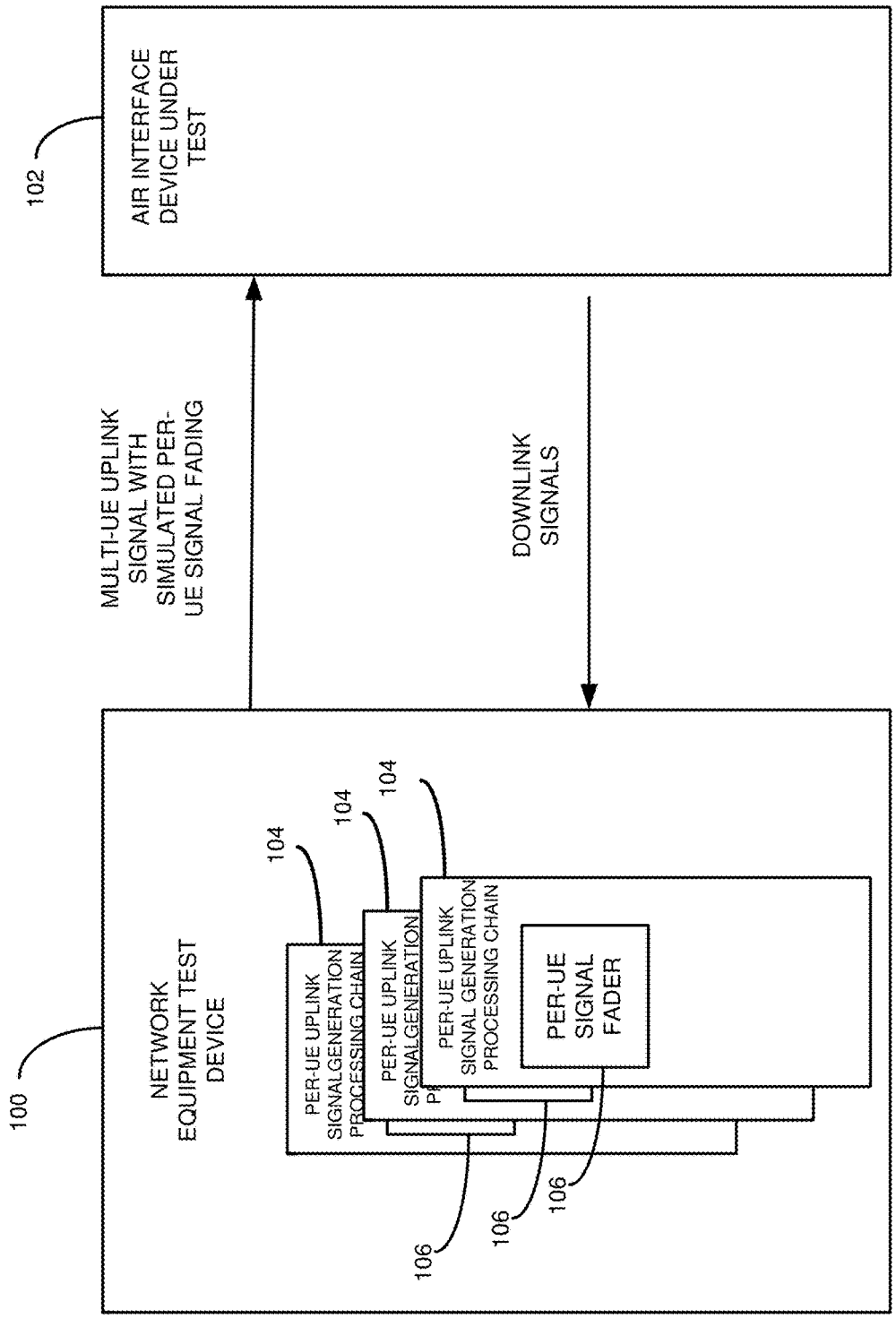
FIG. 1 is a block diagram illustrating an exemplary test environment for using simulated per-UE signal fading to test an air interface device according to an embodiment of the subject matter described herein.

The subject matter described herein includes methods, systems, and computer readable media for simulating per-UE signal fading for uplink signals to test an air interface device. FIG. 1 is a block diagram illustrating an exemplary test environment for simulating per-UE signal fading to test an air device according to an embodiment of the subject matter described herein. Referring to FIG. 1, a network equipment test device 100 transmits signals to a device under test 102 to test the functionality and performance of the device under test. Device under test 102 may be a stationary air interface device, such as a Node B or an e-Node B.

Network equipment test device 100 may be a multi-UE simulator that simultaneously simulates multiple UEs, such as long term evolution (LTE) or LTE advanced UEs. In the illustrated example, network equipment test device 100 includes uplink signal generation processing chains 104 for generating per-UE time domain uplink signals from simulated UEs to be transmitted to device under test 102. Some of the per-UE uplink signal generation processing chains 104 may generate LTE, LTE advanced, and other uplink signals to test the functionality and performance of device under test 102. Others of the per-UE uplink signal generation processing chains 104 may generate reference signals, control signals and data signals to simulate uplink transmissions by UEs. The combined signal transmitted to the air interface device under test is a multi-UE uplink signal with simulated per-UE signal fading.

Uplink signal generation processing chains 104 further include a plurality of per-UE signal faders 106 for simulating signal fading for per-UE time domain uplink signals on a per-UE basis. Because signal fading is simulated on a per-UE basis, different signal fading can be applied to signals from different UEs. In addition, because signal fading is applied to time domain signals, the architecture of network equipment test device 100 is simplified compared to devices with frequency domain faders. As a result, the test environment generated by network equipment test device 100 more accurately simulates a real network environment where signal fading varies among UEs due to different signal propagation paths that each UE experiences in real environments.

Figure 2:
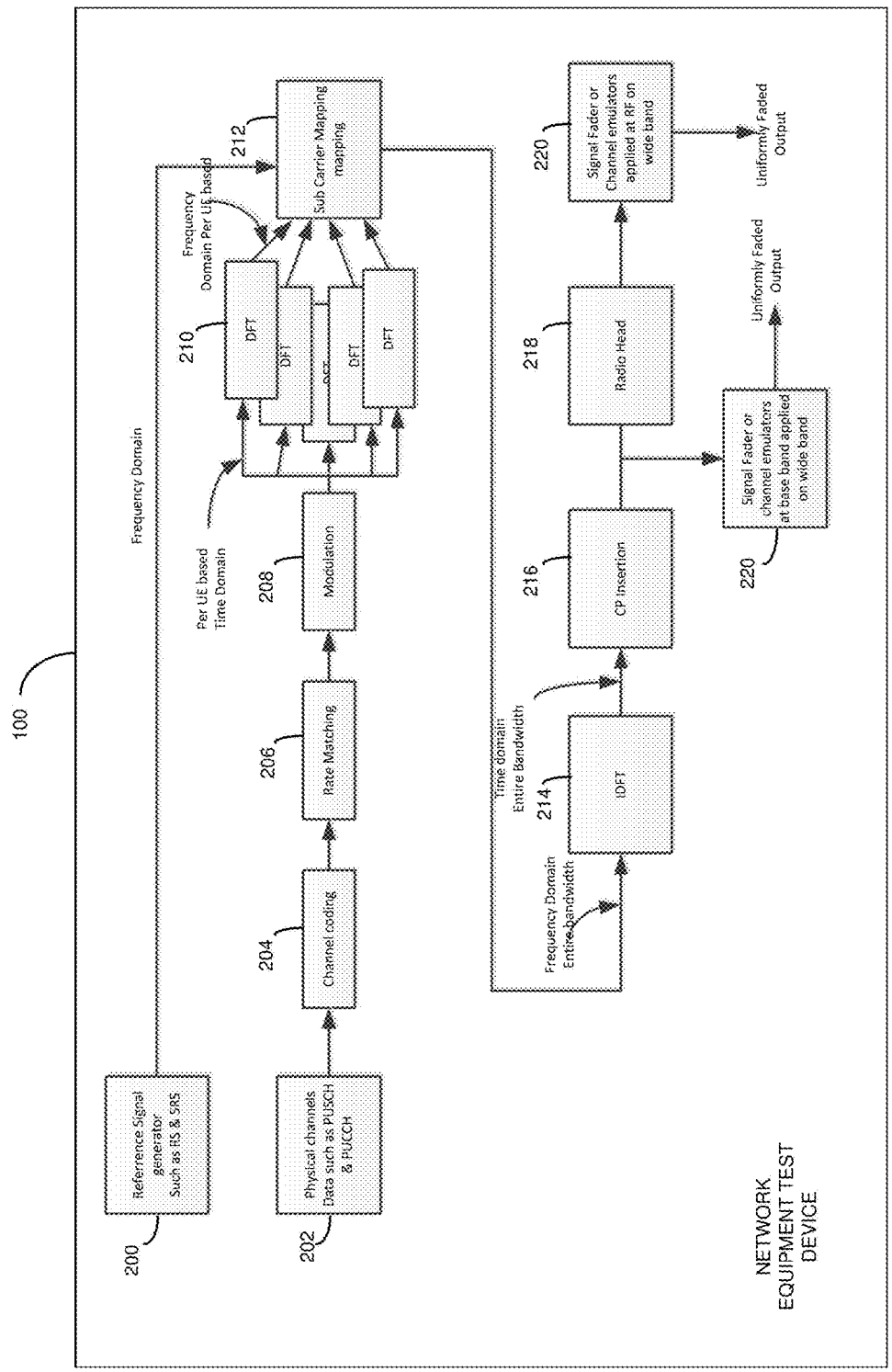
FIG. 2 is a block diagram illustrating a conventional uplink signal chain for simulating the same fading for all uplink signals.

FIG. 2 is a block diagram of an uplink signal chain architecture implemented by a conventional network equipment test device where the same signal fading is applied to the combined uplink signal from all UEs. Referring to FIG. 2, the uplink signal chain architecture includes a reference signal generator 200 for generating simulated UE reference signals and a physical channel generator 202 for generating physical uplink data and control channels, such as the LTE physical uplink shared channel (PUSCH) and physical uplink control channel (PUCCH). The physical channels undergo channel coding 204, rate matching 206, modulation 208, and discrete Fourier transform (DFT) processing by DFT processing units 210 before the physical channels along with the reference signals undergo subcarrier mapping by subcarrier mapping unit 212, which maps the physical channels to uplink resource blocks.

After subcarrier mapping, the entire uplink signal is in the frequency domain. However, the signal must be converted to the time domain before being transmitted over the air interface. Accordingly, the signal undergoes inverse discrete Fourier transformation by inverse discrete Fourier transformation (IDFT) unit 214 and cyclic prefix (CP) insertion 216 before the signal is provided to radio head 218 and then either transmitted wirelessly over the air interface to a device under test or over a simulated air interface using cables to the device under test.

In conventional multi-UE simulators, the signal fading is applied either after CP insertion 216 or after processing by radio head 218. Such fading is applied to the entire signal covering the entire assigned bandwidth such that all UEs are subject to the same fading. These two conventional methods for signal fading are represented in FIG. 2 by signal faders 220. Applying the same fading to the entire signal usually occupied by multiple UE's does not accurately simulate real world conditions. In addition, wideband signal fader can be an expensive piece of equipment, which increases the cost of network test equipment.

Figure 3:
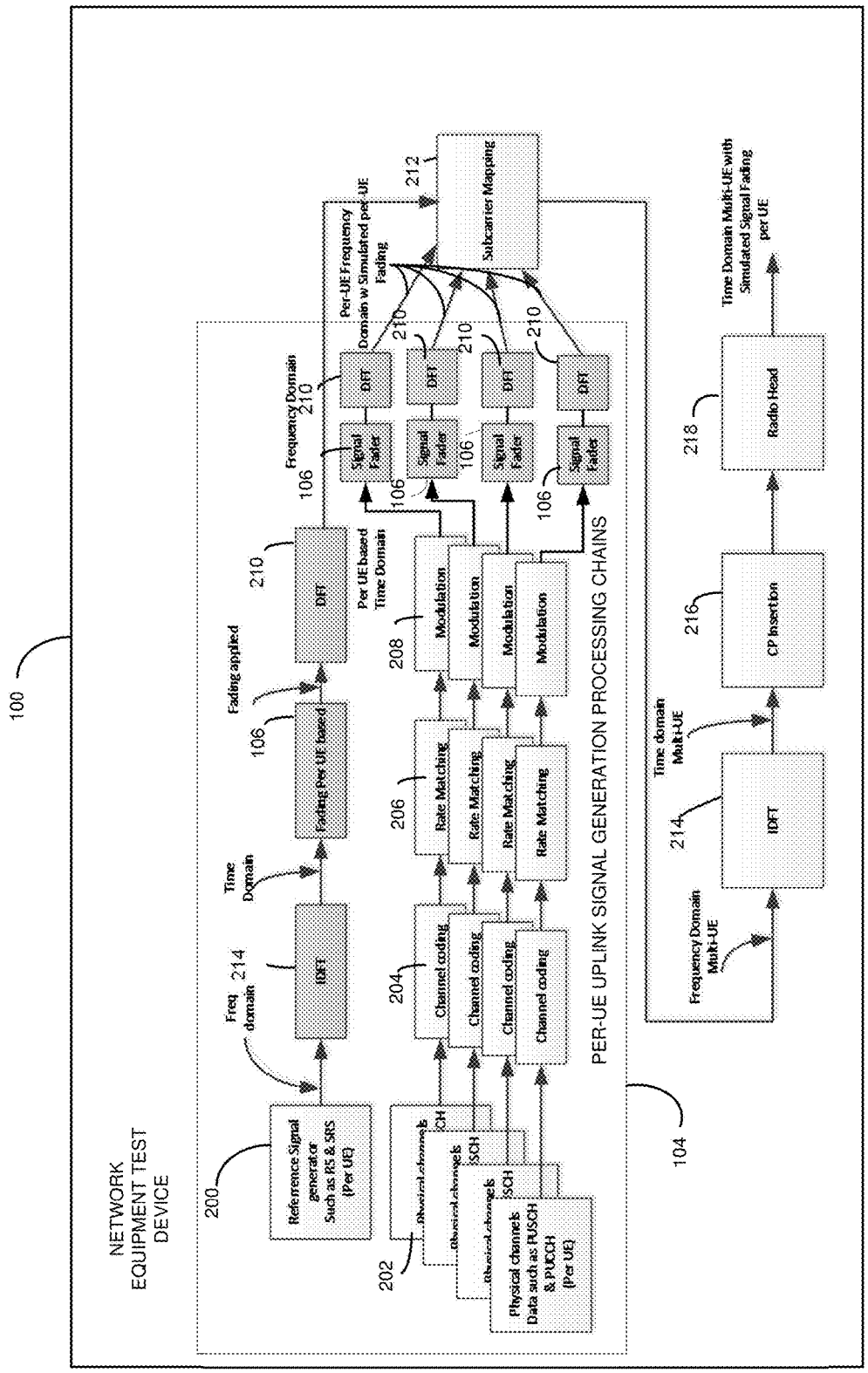
FIG. 3 is a block diagram illustrating an exemplary uplink signal chain architecture for simulating per-UE signal fading for uplink signals according to an embodiment of the subject matter described herein.

In order to avoid the shortcomings of wideband signal fading, the subject matter described herein includes per-UE simulated signal fading of uplink signals. FIG. 3 is a block diagram of an exemplary system for simulated per-UE signal fading according to an embodiment of the subject matter described herein. Referring to FIG. 3, the correspondingly numbered blocks in the uplink signal chain perform the same functions as those described with respect to FIGS. 1 and 2. Accordingly, a complete description thereof will not be repeated herein. In addition, although a single box 104 is shown in FIG. 3 for simplicity to represent per-UE uplink signal generation processing chains 104 introduced in FIG. 1, it is understood that each chain of a physical channel generator 202, a channel coder 204, a rate matcher 206, a modulator 208, a signal fader 208, and a DFT unit 210 constitutes an individual and separate per-UE uplink signal generation processing chain. In addition, although only a single chain of reference signal generator 200, IDFT 214, fader 106, and DFT 210 is shown in FIG. 3, it is understood that multiple such chains may exist to generate reference signals on a per UE basis and apply simulated signal fading on a per-UE basis to each reference signal. Thus, each chain of reference signal generator 200, IDFT 214, fader 106, and DFT 210 may also be considered an uplink signal generation processing chain with simulated per-UE signal fading.

In FIG. 3, rather than applying simulated signal fading on a wideband basis as illustrated in FIG. 2, per-UE time domain signal faders 106 simulate per-UE signal fading for the time domain uplink signal for each UE. The per-UE time domain signal faders 106 simulate signal fading for the time domain uplink signals using the per-UE uplink signal generation processing chains 104 and prior to discrete Fourier transformation and subcarrier mapping. In addition, per-UE signal fading is also simulated for the reference signal for each UE. Because signal fading is simulated on a per-UE basis, different simulated signal fading can be applied to signals generated for different simulated UEs. For example, fading for an uplink signal for one UE may be simulated using the generated amplitude and phase shift values stored in a first table designed to simulate fast signal fading. Fading for a signal for another UE may be simulated using the generated amplitude and phase shift values stored in a second table designed to simulate slow signal fading. Simulating per-UE signal fading can be performed in software or hardware in the per-UE uplink signal generation processing chains of network equipment test device 100 without requiring a conventional wideband signal fader.

As an example in general, a very simple real uplink signal for a single UE can be represented in the time domain by:

$$B^*\cos(2\pi f t), \quad (1)$$

where B is the amplitude and f is the frequency of the uplink signal. Applying simulated per-UE signal fading may be accomplished by generating simulated scattered signals that simulate the effect of each uplink signal being scattered or reflected from multiple objects and adding the scattered signals to the uplink signal. In one example, signal faders 106 may simulate the effects of multipath signal propagation on each per-UE uplink signal as if the per-UE uplink signal were propagating in an urban environment. Each scattered signal may represent a version of the per-UE uplink signal with an amplitude variation and a phase shift, as indicated by the following equation:

$$S^*B^*\cos(2\pi f t+\phi), \quad (2)$$

where S is the amplitude scaling factor and $\phi$ is the phase shift. In one embodiment the values of S and $\phi$ are precomputed and stored for each UE and used to vary the simulated signal fading for each UE over time. The signal received by the device under test (DUT) will look similar to the sum of the transmitted signal and the scattered signals that reach the DUT, as indicated by the following equation:

$$R(t)=B^*\cos(2\pi f t)+\Sigma_0^N S_N^*B^*\cos(2\pi f t+\phi_N) \quad (3)$$

where R(t) is resulting time domain signal for a particular UE, $S_N$ is the amplitude scaling factor for the Nth scattered signal, $\phi_N$ is the phase shift for the Nth scattered signal, and N is the number of scattered signal for a given time domain uplink signal. Calculations such as those illustrated in Equation 2 or Equation 3 may be performed for each per-UE time domain uplink signal where the amplitude scaling factor and the phase shifts are computed and stored such that each per-UE signal potentially receives different amounts of simulated fading and the simulated fading for each UE varies over time.

In one example, per-UE time domain signal faders 106 may pre-calculate and pre-store phase and amplitude scaling factor values to simulate both fast and slow fading on a per-UE basis. The first three rows in Table 1 shown below illustrate an example of slow fading values for amplitude and phase that may be calculated and stored for a particular simulated UE. In Table 1, it is assumed that the phase of the originally transmitted signal is 0°. Thus, phases of 1°-3° in the first three rows simulate slow fading, as such signals would be nearly in phase and additive to the originally transmitted signal. The next three rows represent an example of phase values that change more rapidly in time to simulate fast fading. For example, signals that are 10° or more out of phase simulate fast fading, as such signals are likely to destructively interfere with the originally transmitted signal. Such data may be calculated and stored in advance of signal transmission time for each UE to simulate both fast and slow fading on a per-UE basis.

In one example, the values in Table 1 below can be applied directly to an equation for each simulated uplink signal, such as Equation 2, to simulate fading of the uplink signal. In another example, the values in Table 1 can be applied to equations for scattered versions of the transmitted signal, such as the cosine term in Equation 3, which are added to the signal representing the transmitted signal.

TABLE 1

Example Pre-Computed Phase and Amplitude Values to Simulated Slow and Fast Fading

| Absolute Phase difference from the ideal Phase | Amplitude Scaling Factor |
|---|---|
| 1° | .95 |
| 2° | .95 |
| 3° | .98 |
| 10° | .50 |
| 15° | .33 |
| 20° | .27 |

The subject matter described herein is not limited to using Equation 2 or 3 to simulate per-UE fading. In an alternate implementation, per-UE time domain signal faders 106 may simulate Rayleigh fading on a per-UE basis. Rayleigh fading may be simulated using any suitable model for Rayleigh fading, including the Jakes' model, set forth in William C. Jakes, Editor (Feb. 1, 1975). *Microwave Mobile Communications*. New York: John Wiley & Sons Inc. ISBN 0-471-43720-4, the disclosure of which is incorporated herein by reference in its entirety. Jakes' model for Rayleigh fading is based on summing sinusoids. Let the scatterers be uniformly distributed around a circle at angles $\alpha_n$ with k rays emerging from each scatterer. The Doppler shift on ray n is $$f_n = f_d \cos \alpha_n \quad (4)$$

and, with M such scatterers, the Rayleigh fading of the $k^{th}$ waveform over time t can be modeled as:

$$R(t, k) = 2\sqrt{2}\left[\sum_{n=1}^{M}(\cos\beta_n + j\sin\beta_n)\cos(2\pi f_n t + \theta_{n,k}) + \frac{1}{\sqrt{2}}(\cos\alpha + j\sin\alpha)\cos 2\pi f_d t\right]. \quad (5)$$

Here, $\alpha$, $\beta_n$ and $\Theta_{n,k}$ are model parameters with $\alpha$ usually set to zero, $\beta$ chosen so that there is no cross-correlation between the real and imaginary parts of R(t):

$$\beta_n = \frac{\pi n}{M+1} \quad (6)$$

and $\Theta_{n,k}$ used to generate multiple waveforms. If a single-path channel is being modeled, so that there is only one waveform, then $\Theta_n$ can be zero. If a multipath, frequency-selective channel is being modeled so that multiple waveforms are needed, Jakes suggests that uncorrelated waveforms are given by:

$$\theta_{n,k} = \beta_n + \frac{2\pi(k-1)}{M+1}. \quad (7)$$

As with the fading simulation parameters used in Equation 3, the fading simulation parameters used in Equations 4-7, e.g., $\alpha$, $\beta_n$ and $\Theta_{n,k}$ can be precomputed and stored on a per-UE basis by per-UE time domain signal faders 106 and used to generate per-UE fading of each time domain UE signal during a test.

Figure 4:
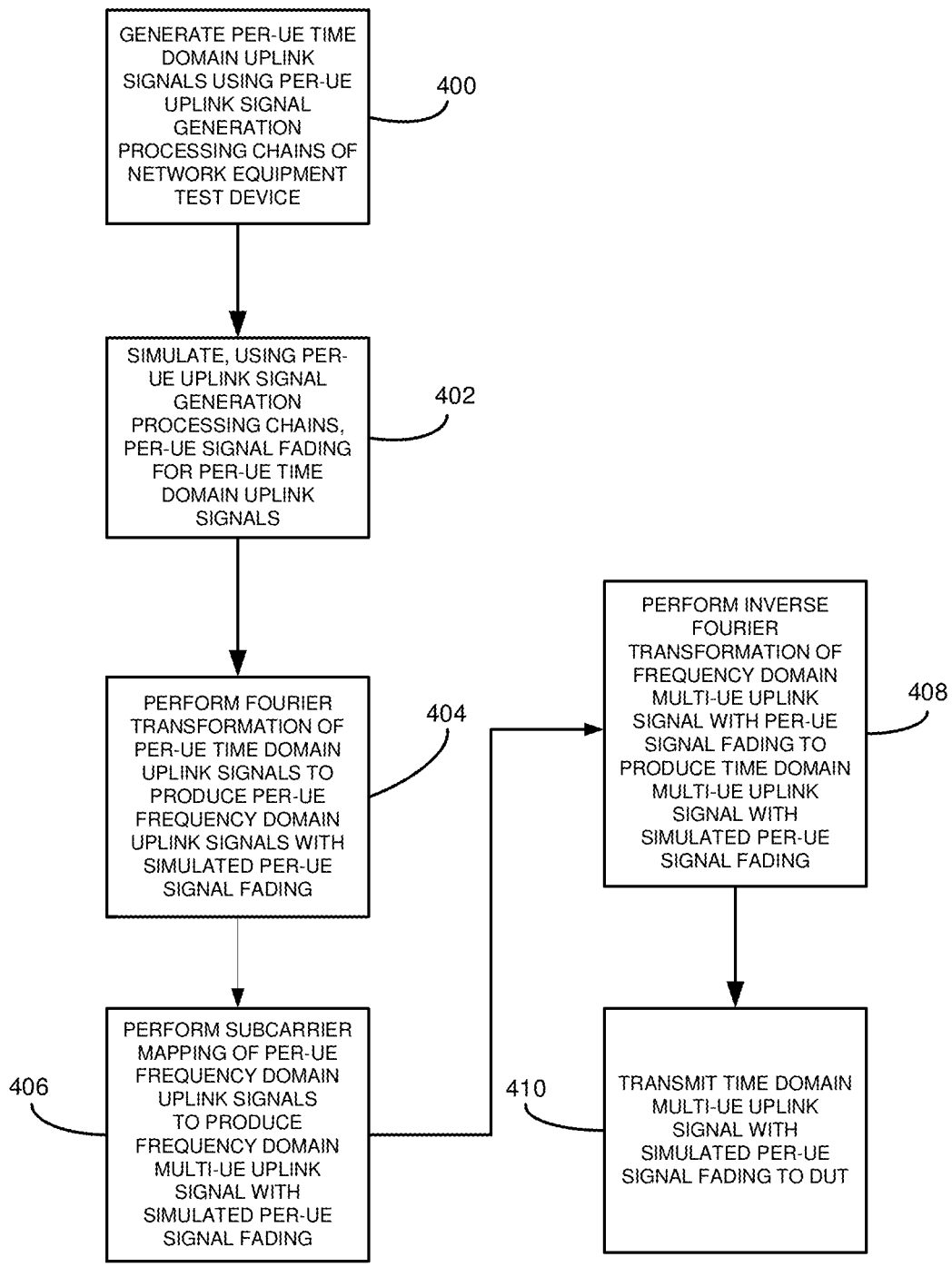
FIG. 4 is a flow chart illustrating an exemplary process for testing an air interface device by simulating per-UE signal fading for uplink signals according to an embodiment of the subject matter described herein.

FIG. 4 is a flow chart illustrating exemplary steps for testing an air interface device using simulated per-UE signal fading of uplink signals according to an embodiment of the subject matter described herein. Referring to FIG. 4, in step 400, per-UE time domain uplink signals are generated using the per-UE uplink signal generation processing chains of the network equipment test device. For example, network equipment test device 100 may generate physical channels and reference signals for multiple UEs. Each per-UE signal generation processing chain 104 may produce a per-UE time domain uplink signal for one simulated UE.

In step 402, per-UE signal fading is simulated for the per-UE time domain uplink signals, wherein simulating per-UE signal fading includes using different amplitudes and phases to simulate different fading over time. Varying the amplitude and phase of the uplink signals (either directly or indirectly by summing with scattered signals) over time simulates the fading effect on the receiving side of the DUT In step 404, Discrete Fourier transformation of each of the, per-UE time domain uplink signals with simulated per-UE signal fading is performed to produce per-UE frequency domain uplink signals with simulated per-UE signal fading. The Fourier transformation may be performed by discrete Fourier transformation units 210 illustrated in FIG. 3. The discrete Fourier transformation transforms the time domain signals into frequency domain per-UE uplink signals with simulated per-UE signal fading.

In step 406, subcarrier mapping of the per-UE frequency domain uplink signals is performed to produce a frequency domain multi-UE uplink signal with simulated per-UE signal fading. The subcarrier mapping may be performed by subcarrier mapping unit 212 illustrated in FIG. 3. The output of the subcarrier mapping is a frequency domain multi-UE signal with simulated per-UE signal fading.

In step 408, inverse Fourier transformation of the frequency domain multi-UE uplink signal is performed to produce a time domain multi-UE uplink signal with simulated per-UE signal fading. The inverse discrete Fourier transformation may be performed by IDFT unit 214 illustrated in FIG. 3. The output of IDFT unit 214 is a time domain multi-UE uplink signal with simulated per-UE signal fading.

In step 410, the time domain multi-UE uplink signal with simulated per-UE signal fading is transmitted to the device under test. For example, network equipment test device 100 transmits the combined uplink signal of all of the UEs being simulated to the device under test over a wired or wireless interface, depending on the test configuration.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for testing an air interface device using signals with simulated per-user equipment (UE) signal fading, the method comprising:
   at a network equipment test device:
      generating, using per-UE uplink signal generation processing chains in a multi-UE simulator of the network equipment test device, per-UE time domain uplink signals;
      simulating, using the per-UE uplink signal generation processing chains, per-UE signal fading for the per-UE time domain uplink signals, wherein simulating per-UE signal fading includes using different phases and amplitudes over time to simulate different signal fading;
      performing Fourier transformation of each of the per-UE time domain uplink signals to produce per-UE frequency domain uplink signals with simulated per-UE signal fading;
      performing subcarrier mapping of the per-UE frequency domain uplink signals to produce a frequency domain multi-UE uplink signal with simulated per-UE signal fading;
      performing inverse Fourier transformation of the frequency domain multi-UE uplink signal to produce a time domain uplink signal with simulated per-UE signal fading; and
      transmitting the time domain multi-UE uplink signal with simulated per-UE signal fading to the air interface device under test.

2. The method of claim 1 wherein generating the per-UE time domain uplink signals includes generating long term evolution (LTE) or LTE advanced uplink signals.

3. The method of claim 1 wherein generating the per-UE time domain uplink signals includes generating uplink reference signals, control channel signals, and data channel signals.

4. The method of claim 3 wherein simulating per-UE signal fading for the per-UE time domain uplink signals includes simulating per-UE signal fading for the reference signals, the data channel signals, and the control channel signals on a per-UE basis.

5. The method of claim 1 wherein using the different phases and amplitudes over time includes using the different phases and amplitudes over time to vary amplitude and phase of each of the per-UE time domain uplink signals over time.

6. The method of claim 1 wherein simulating per-UE signal fading includes simulating effects of interference from one or more scattered versions of a per-UE time-domain uplink signal on the per-UE time domain uplink signal.

7. The method of claim 1 wherein simulating per-UE signal fading includes simulating effects of multipath propagation on the per-UE time domain uplink signals.

8. The method of claim 1 wherein simulating per-UE signal fading includes simulating Rayleigh fading of the per-UE time domain uplink signals.

9. The method of claim 1 wherein the air interface device under test comprises an evolved Node B (e-Node B).

10. A system for testing an air interface device using per user equipment (UE) faded signals, the system comprising:
   a network equipment test device including:
      a plurality of per-UE uplink signal generation processing chains for generating per-UE time domain uplink signals;
      the per-UE uplink signal generation processing chains including a plurality of per-UE signal faders for simulating per-UE signal fading for the per-UE time domain uplink signals, wherein simulating per-UE signal fading includes using different phases and amplitudes over time to simulate different signal fading;
      a plurality of per-UE Fourier transformation units for performing Fourier transformation of each of the per-UE time domain uplink signals with simulated per-UE signal fading to produce per-UE frequency domain uplink signals with simulated per-UE signal fading;
      a subcarrier mapping unit for performing subcarrier mapping of the per-UE frequency domain uplink signals to produce a frequency domain multi-UE uplink signal with simulated per-UE signal fading;

an inverse Fourier transformation unit for performing inverse Fourier transformation of the frequency domain multi-UE uplink signal to produce a time domain multi-UE uplink signal with simulated per-UE signal fading; and a network interface for transmitting the time domain multi-UE uplink signal with simulated per-UE signal fading to the air interface device under test.

11. The system of claim 10 wherein the per-UE uplink signal generation processing chains are configured to generate long term evolution (LTE) or LTE advanced uplink signals.

12. The system of claim 10 wherein the uplink signal generators are configured to generate uplink reference signals, control channel signals, and data channel signals.

13. The system of claim 12 wherein the per-UE signal faders are configured to simulate per-UE signal fading for the reference signals, the data channel signals, and the control channel signals on a per-UE basis.

14. The system of claim 10 wherein the per-UE signal faders are configured to use the different phases and amplitudes over time to vary amplitude and phase of each of the per-UE time domain uplink signals over time.

15. The system of claim 10 wherein the per-UE signal faders are configured to simulate effects of interference from one or more scattered versions of a per-UE time domain uplink signal on the per-UE time-domain uplink signal.

16. The system of claim 10 wherein the per-UE signal faders are configured to simulate effects of multipath propagation on the per-UE time domain uplink signals.

17. The system of claim 10 wherein the air interface device under test comprises an evolved Node B (e-Node B).

18. A non-transitory computer readable medium having stored thereon executable instructions that when executed by the processor of a computer control the computer to perform steps comprising:

at a network equipment test device:

generating, using per-UE uplink signal generation processing chains in a multi-UE simulator of the network equipment test device, per-UE time domain uplink signals;

simulating, using the per-UE uplink signal generation processing chains, per-UE signal fading for the per-UE time domain uplink signals, wherein simulating per-UE signal fading includes using different phases and amplitudes over time to simulate different signal fading;

performing Fourier transformation of each of the per-UE time domain uplink signals to produce per-UE frequency domain uplink signals with simulated per-UE signal fading;

performing subcarrier mapping of the per-UE frequency domain uplink signals to produce a frequency domain multi-UE uplink signal with simulated per-UE signal fading;

performing inverse Fourier transformation of the frequency domain multi-UE uplink signal to produce a time domain multi-UE uplink signal with simulated per-UE signal fading; and transmitting the time domain multi-UE uplink signal with simulated per-UE signal fading to the air interface device under test.

* * * * *

UNITED STATES PATENT AND TRADEMARK OFFICE
CERTIFICATE OF CORRECTION

PATENT NO. : 10,142,865 B2  
APPLICATION NO. : 15/134338  
DATED : November 27, 2018  
INVENTOR(S) : Prasada Rao Devarasetty Page 1 of 1

It is certified that error appears in the above-identified patent and that said Letters Patent is hereby corrected as shown below:

On the Title Page

In item (73), in Column 1, in "Assignee", Line 1, delete "KRYSIGHT" and insert -- KEYSIGHT --, therefor.

Signed and Sealed this  
Twenty-second Day of October, 2019

Andrei Iancu  
*Director of the United States Patent and Trademark Office*